Feb. 24, 1931.    A. R. RIDDERSTROM    1,794,204
TAPE APPLYING MACHINE
Filed April 24, 1928    10 Sheets-Sheet 7

Fig-7-

Feb. 24, 1931. A. R. RIDDERSTROM 1,794,204
TAPE APPLYING MACHINE
Filed April 24, 1928  10 Sheets-Sheet 8

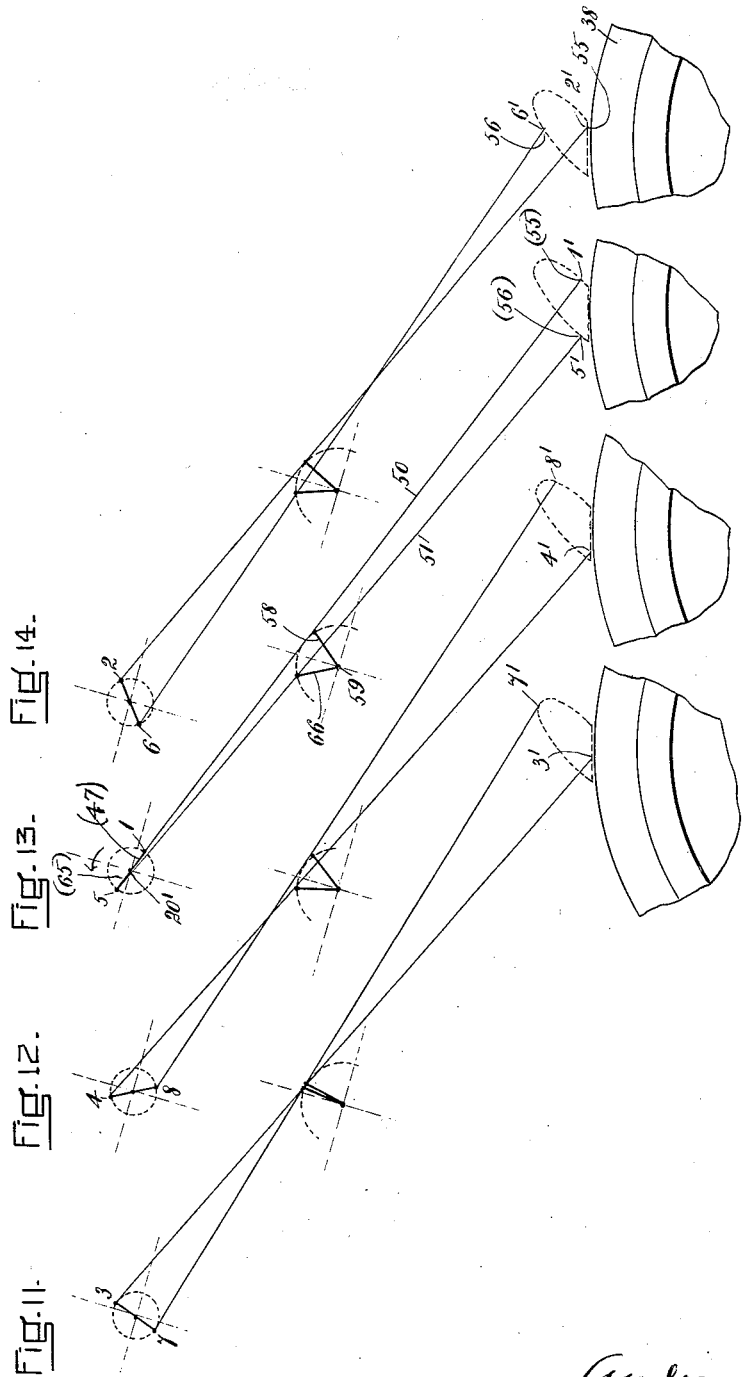

Feb. 24, 1931.                A. R. RIDDERSTROM                1,794,204
                              TAPE APPLYING MACHINE
                      Filed April 24, 1928    10 Sheets-Sheet 10
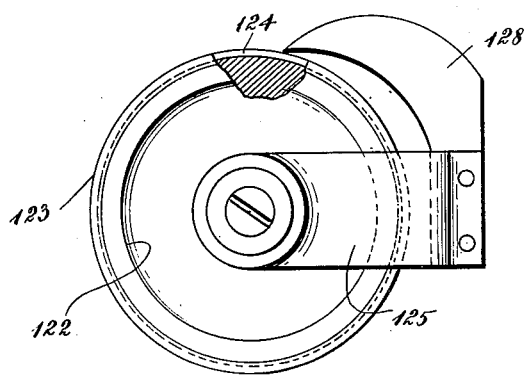
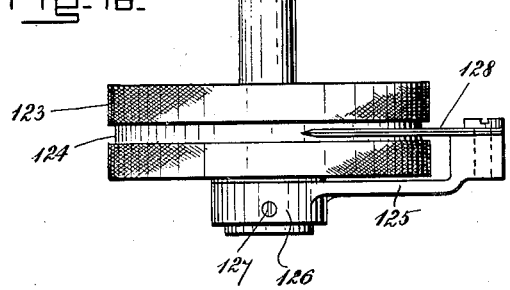
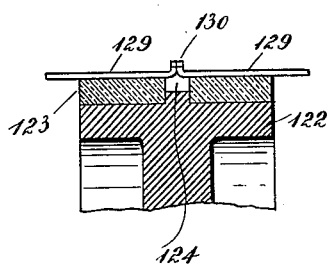
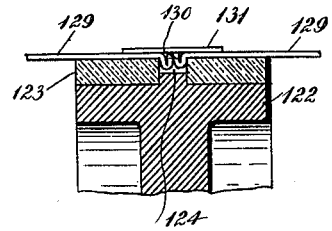

Patented Feb. 24, 1931

1,794,204

UNITED STATES PATENT OFFICE

ANDREW R. RIDDERSTROM, OF LYNN, MASSACHUSETTS, ASSIGNOR TO PRIME MANUFACTURING COMPANY, OF LYNN, MASSACHUSETTS, A CORPORATION OF MASSACHUSETTS

TAPE-APPLYING MACHINE

Application filed April 24, 1928. Serial No. 272,546.

This invention relates to a machine for applying adhesive tape to leather and like materials for reinforcing the same.

One of the objects of my invention is to provide a high-speed tape-applying machine in which the presser fingers which co-operate with a revoluble work support, move forwardly or away from the operator in substantially a straight line so that one portion of one finger is in contact with the tape throughout its forward stroke, and is then given a rapid rearward oscillatory movement over the other finger while the second finger is making its forward stroke.

Another object of my invention is to provide an improved cutter, preferably treadle-actuated, for severing the tape after a length thereof has been applied to the work, such cutter comprising a pivoted curvilinear member having a serrated edge, the points of which enter the tape when said member is rotated about its pivot.

A further object is to provide a friction clutch or lock for preventing the retrograde movement of the tape after the same has been severed by the cutter, and during the downward movement of a tape carrier.

Another object is to provide a tape carrier so constructed and arranged that when the cutter is rotated about its pivot to sever the tape, said carrier will move upwardly away from the work support and when said cutter is resuming its normal position, will move downwardly toward the work support to carry the severed end of the tape away from the cutter and leave the same in convenient position for application to the next piece of work.

With the foregoing and other objects in view, my invention comprises the novel parts and combinations of parts hereinafter more fully described, In the accompanying drawings I show a tape-applying machine embodying my invention in the form now preferred by me, although it is to be understood that said drawings are to be considered as illustrative only and not as restrictive.

In the drawings:—

Fig. 9 is a plan view on an enlarged scale of the tape lock and the wiper;

Fig. 10 is a section taken on the line 10—10 of Fig. 9;

Figs. 11, 12, 13 and 14 are kinematic diagrams employed to explain the means whereby the proper motion is imparted to the presser fingers;

Fig. 15 is an elevation, partly in section, of a modified form of work support employed when the tape is to be applied to the back of a seam;

Figure 1:
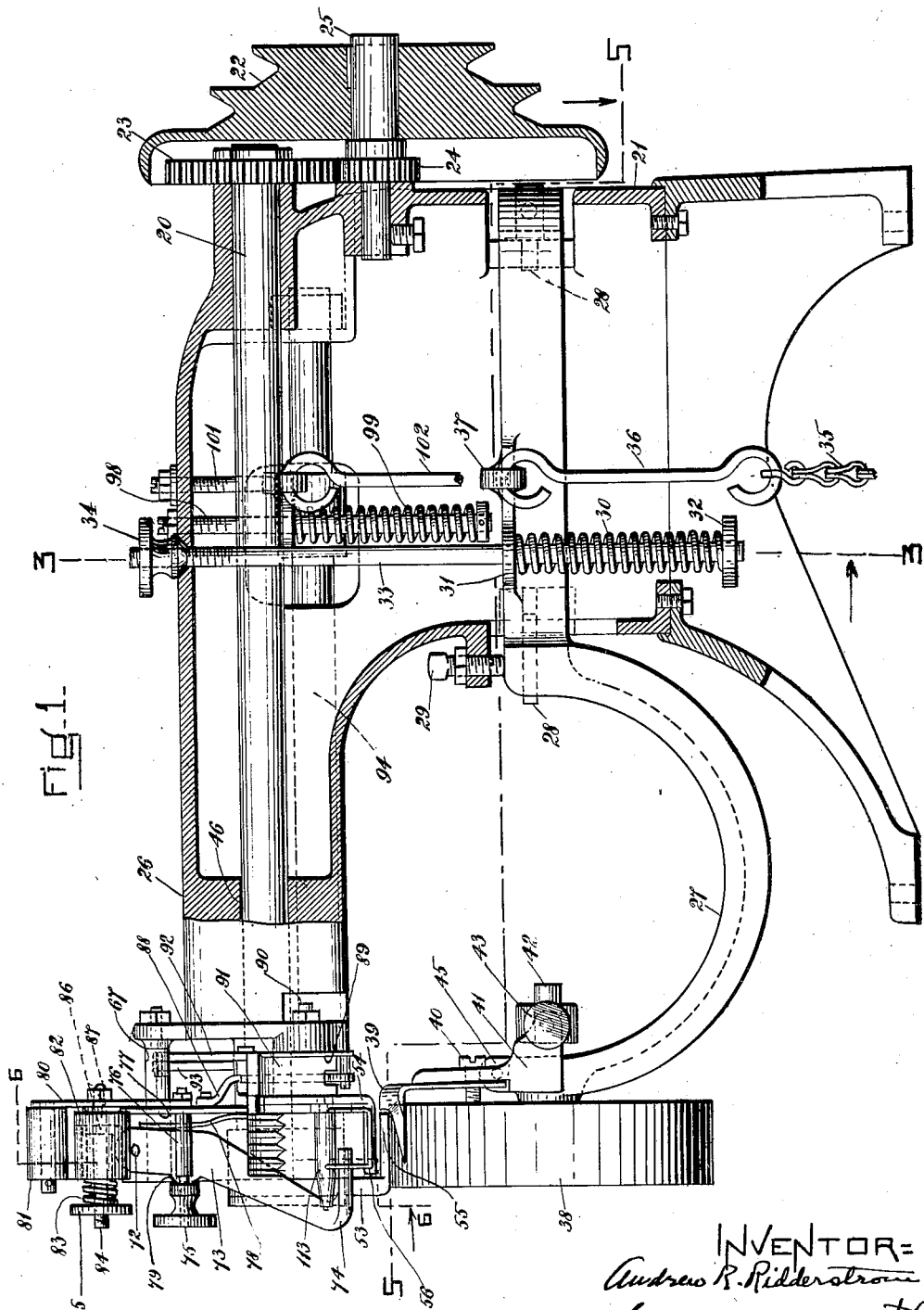
Figure 1 is a side elevation of a tape-applying machine embodying my invention, certain parts being shown in section.

Fig. 16 a plan view of the work support shown in Fig. 15;

Fig. 17 is a fragmentary transverse section of said work support showing two seamed pieces of leather resting on the work support before the application of the tape to the seam ridge;

Fig. 18 is a fragmentary sectional view of said work support showing the tape applied to the seam ridge.

In the particular drawings selected for more fully disclosing the principle of my invention, 20 represents a driving shaft suitably journalled in the frame 21 and arranged to be driven by the pulley 22 through the intermediary of the gear 23 and pinion 24 which are rigidly connected with said shaft 20 and the pulley stud 25, respectively. Arranged beneath the arm 26 which overhangs the frame is a curved arm 27 pivotally connected to the frame at 28, 28 and provided with an adjustable stop 29 to limit the upward movement of the same, a spring 30 interposed between the flange 31 integral with the arm 27 and the washer 32 attached to the end of the vertical rod 33 serving to hold the arm 27 against its stop. The rod 33 passes loosely through a hole in said flange 31 and projects through the upper part of the arm 26 where it is provided with a knurled head 34 for adjusting the tension of the spring 30. By means of a treadle (not shown) connected through the chain 35 and link 36 with an eye 37 which projects from, and is integral with, the arm 27, the latter may be rotated about its pivots to move the revoluble work support 38 journalled in the outward end of the arm 27 to inoperative position. The work gauge 39 is attached by the screw 40 to the holder 41 which in turn is pivotally connected with the frame by the stud 42, extending inwardly from the outer end of the arm 27, said holder being maintained in adjusted position by the screw 43 and provided with an adjustable stop 44 which is threaded into a lug 45 integral with said arm.

Mounted on the forward reduced end 20' of the driving shaft 20 which has a bearing 46 in the forward end of the overhanging arm 26 are two oppositely-disposed eccentrics, one of which is shown in section at 47 (Figs. 6 and 7), the said eccentrics being enclosed within the eccentric bands 48, 49, integral with the arms 50, 51, respectively, to which are attached by the screws 52, or other suitable means, the presser fingers 53, 54, each consisting of a portion extending in the same direction as said arms 50, 51, and an end portion 55, 56 disposed at right angles thereto and extending transversely of the work-supporting roller 38 and immediately above the latter. Means must be provided for imparting a straight-line motion to the forward stroke of the presser fingers so that from the beginning to the end of such stroke, successively different portions of each presser finger will be in contact with the work and for giving a rapid rearward oscillatory movement to each finger at the end of its work stroke over the other finger, while the latter is making its work stroke. This I accomplish in the present instance by providing a movable pivot for each of the arms 50, 51, whereby to compensate for the oscillatory motion imparted to the arms by the driving eccentrics. For the purpose of more fully disclosing my invention, I shall now describe the specific means employed by me for accomplishing the result above set forth, but it is to be understood that a variety of equivalent means will readily occur to those skilled in the art, and that I do not limit myself to the particular mechanisms herein disclosed, except as required by the appended claims.

Figure 4:
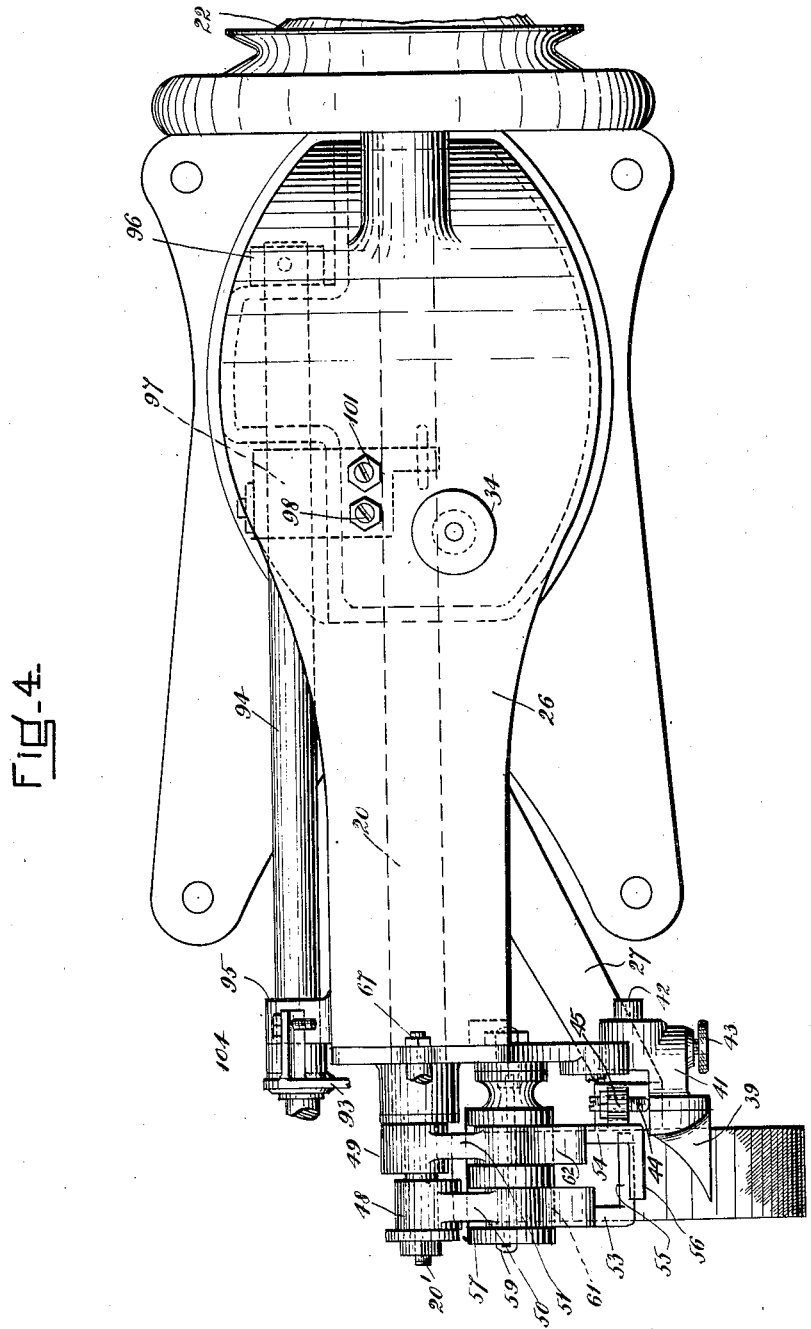
Fig. 4 is a plan view.
Figure 5:
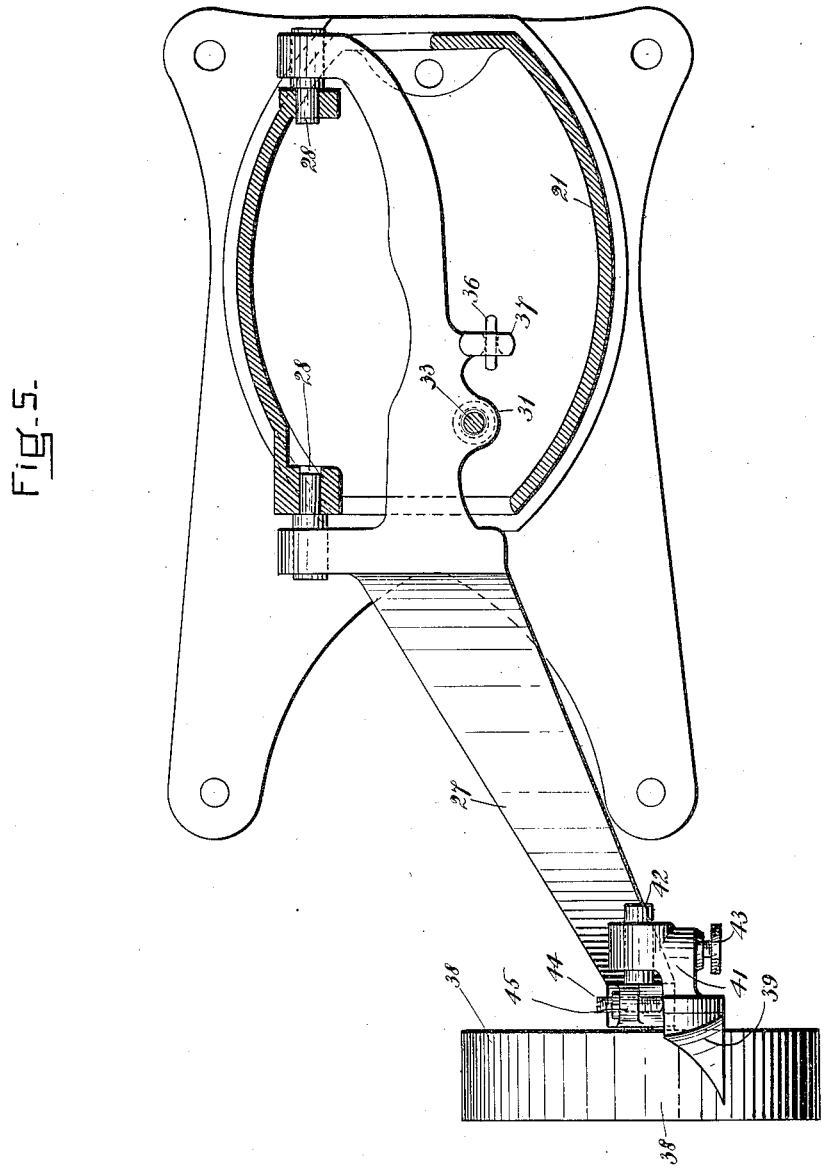
Fig. 5 is a horizontal longitudinal section taken on the line 5—5 of Fig. 1.

Attached to and extending laterally from the overhanging arm 26 is a head 57 (Fig. 4) provided with two recesses placed side by side and in line, respectively, with the driving eccentrics, in each of which recesses, respectively, is disposed an eccentric, one being shown in section at 58. The said eccentrics are mounted on the stud 59 which passes through the head 57 and is held in position by the set-screw 60. The arms 50, 51 are provided with eccentric bands 61, 62 which enclose the eccentrics carried by the stud 59.

In Figs. 6, 7 and 8, 63 represents a surface to which the adhesive tape 64 is to be applied.

Referring now to Figs. 11 to 14, the motion of the presser fingers will be explained. It is of course well understood that an eccentric is mechanically equivalent to a crank having a throw equal to the eccentricity of the eccentric. Therefore, for the sake of simplicity, I have in Figs. 11 to 14, inclusive, represented the eccentric 47 as a crank journalled at 20' and pivotally connected to the arm 50, and I have similarly represented the eccentric 58 as the crank 58 journalled at 59 and pivotally connected to said arm 50, the throw of the crank 47 being equal to the eccentricity of the eccentric 47 and the throw of the crank 58 being equal to the eccentricity of the eccentric 58. The driving eccentric of the arm 51 which corresponds in every respect to the eccentric 47, but is oppositely timed (said eccentric not appearing in the drawings) is represented by the crank 65 having its bearing at 20' and being pivotally connected to the arm 51. In like manner, the eccentric which guides the arm 51 is shown at 66, and this eccentric which does not appear in the drawings, is identical in every respect with the eccentric 58 except that it is differently positioned.

The numerals 55 and 56 in Figs. 11 to 14, inclusive, represent, respectively, the forward tips of the operating portions of the presser fingers. When the parts are in the positions indicated in Fig. 13, finger 55 occupies its extreme rearward position and finger 56 its extreme forward position, each being slightly raised from the roll 38. As the drive shaft rotates and the cranks or eccentrics 47, 65 turn counter-clockwise a few degrees, the tip of the finger 55 is brought forcibly down upon the work, that is, the adhesive tape which rests on the leather to which it is to be applied, while the finger 56. which has just completed its work stroke is moved rapidly rearward in a path which is approximately elliptical. When the parts have the positions shown in Fig. 14, the finger 56 is riding over the finger 55 and the latter is moving forwardly in a straight line at the beginning of its work stroke.

The numerals 1, 2, 3 and 4 in Figs. 11 to 14, inclusive, indicate consecutive positions of the crank (or eccentric) 47, and the numerals 1', 2', 3', 4' represent the positions of the tip of the finger 55 corresponding thereto. The numerals 5, 6, 7 and 8 represent the positions of the crank (or eccentric) 65 when the crank 47 has the positions 1, 2, 3 and 4, respectively; and the numerals 5', 6', 7', 8' represent the corresponding positions of the tip of the finger 56. It will be understood of course that the numerals 1 to 8, inclusive, may be taken as representing the successive positions of either of the cranks, say 47, and that the numerals 1' to 8', inclusive, may be taken as representing the successive positions of the tips of one of the presser fingers, say 55. As the crank 47 continues to rotate in a counter-clockwise direction from position 2 to position 3 (Fig. 11), the finger 55 continues its straight line forward stroke and the finger 56 has reached approximately its upper limit of movement, as shown at 7'. Continued rotation of the crank 47 to position 4 brings the tip of the presser finger 55 almost to the end of its forward stroke, and in this position, the finger 56 is moving downwardly toward the work support. Between positions 4 and 5, the finger 55 has completed its forward stroke and has started to move upwardly, this being indicated at 5', with respect to finger 56, it being noted, as aforesaid, that the numerals 5', 6', 7', 8' may be considered as representing the successive positions of the finger 55, as well as the positions occupied by the finger 56 which correspond to those of finger 55 at positions 1' to 4', inclusive.

It will be noted that by means of the arrangement above described that the movable pivot constituted by the cranks or eccentrics 58, 66, compensate for the oscillatory movement which otherwise would be imparted to the presser fingers during the forward strokes thereof, and that said fingers are given alternately a straight-line motion in one direction to press the tape against the work, and an oscillatory motion in the opposite direction to enable one finger to over-ride the other and reach the beginning of its work stroke.

While I have shown, and my preferred construction involves two presser fingers, it will readily be understood by those skilled in the art that by a slight modification within the skill of the calling, the tape may be applied to the work by one finger only. It will be obvious that the presser fingers and their associated mechanism constitute a feeding mechanism not limited in its application to a tape-applying machine, and therefore I claim broadly a feature mechanism comprising two feeding members with actuating means constructed and arranged to impart to said members alternately a straight-line motion in one direction and an oscillatory motion in the opposite direction.

I am aware that it has been heretofore proposed to feed tape in a straight line by various types of cam-actuated sliding mechanisms, but devices of that type are not durable because of the uneven wear to which the parts are subjected and high speeds cannot be attained. These limitations are overcome by means of the eccentric-actuating and eccentric-guiding means employed for controlling the movement imparted to the presser fingers.

Figure 6:
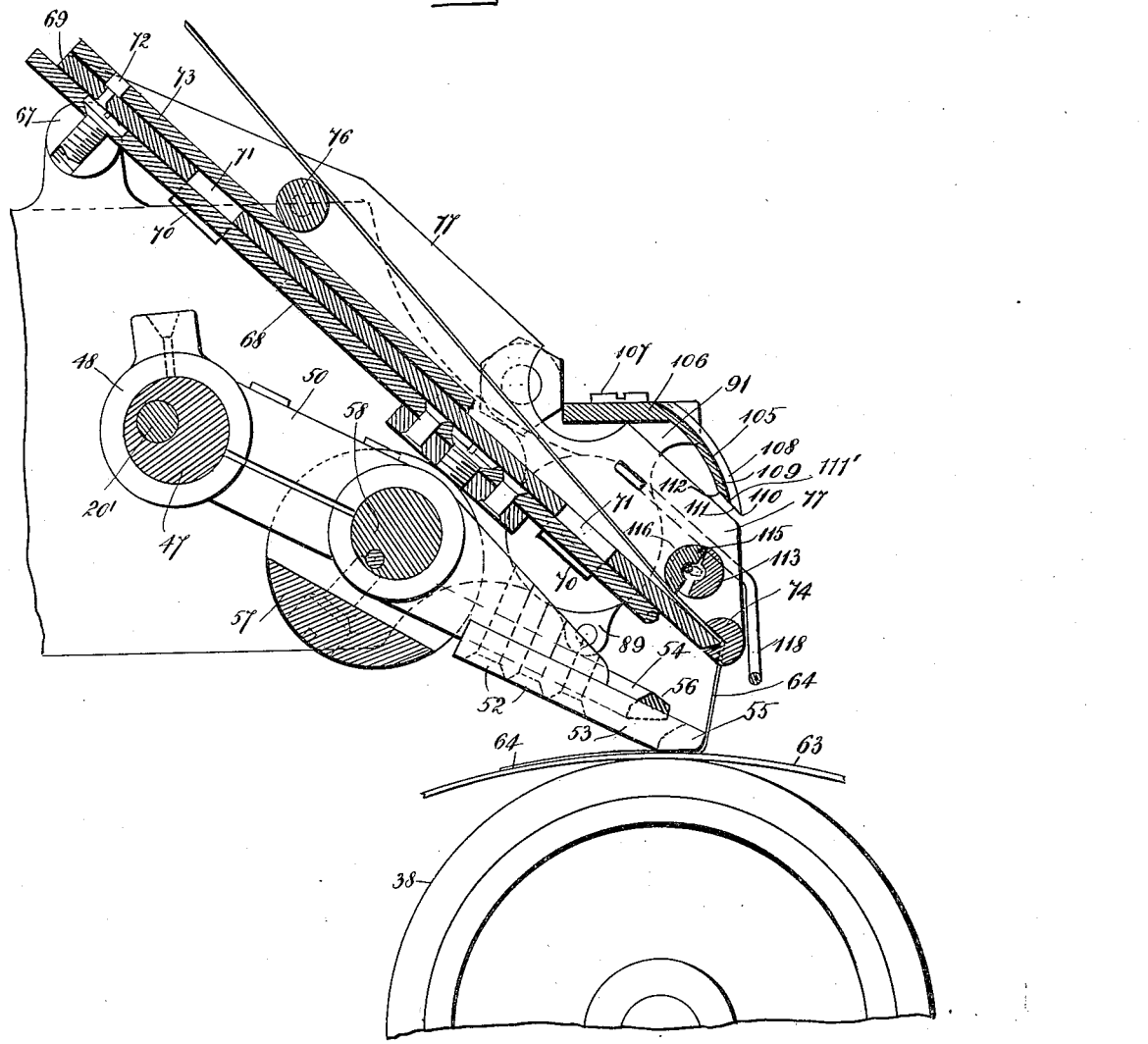
Fig. 6 is a vertical transverse section on an enlarged scale taken on the general plane of the irregular line 6—6 of Fig. 1, certain parts being omitted for the sake of clearness and the cutter being shown in normal position.
Figure 7:
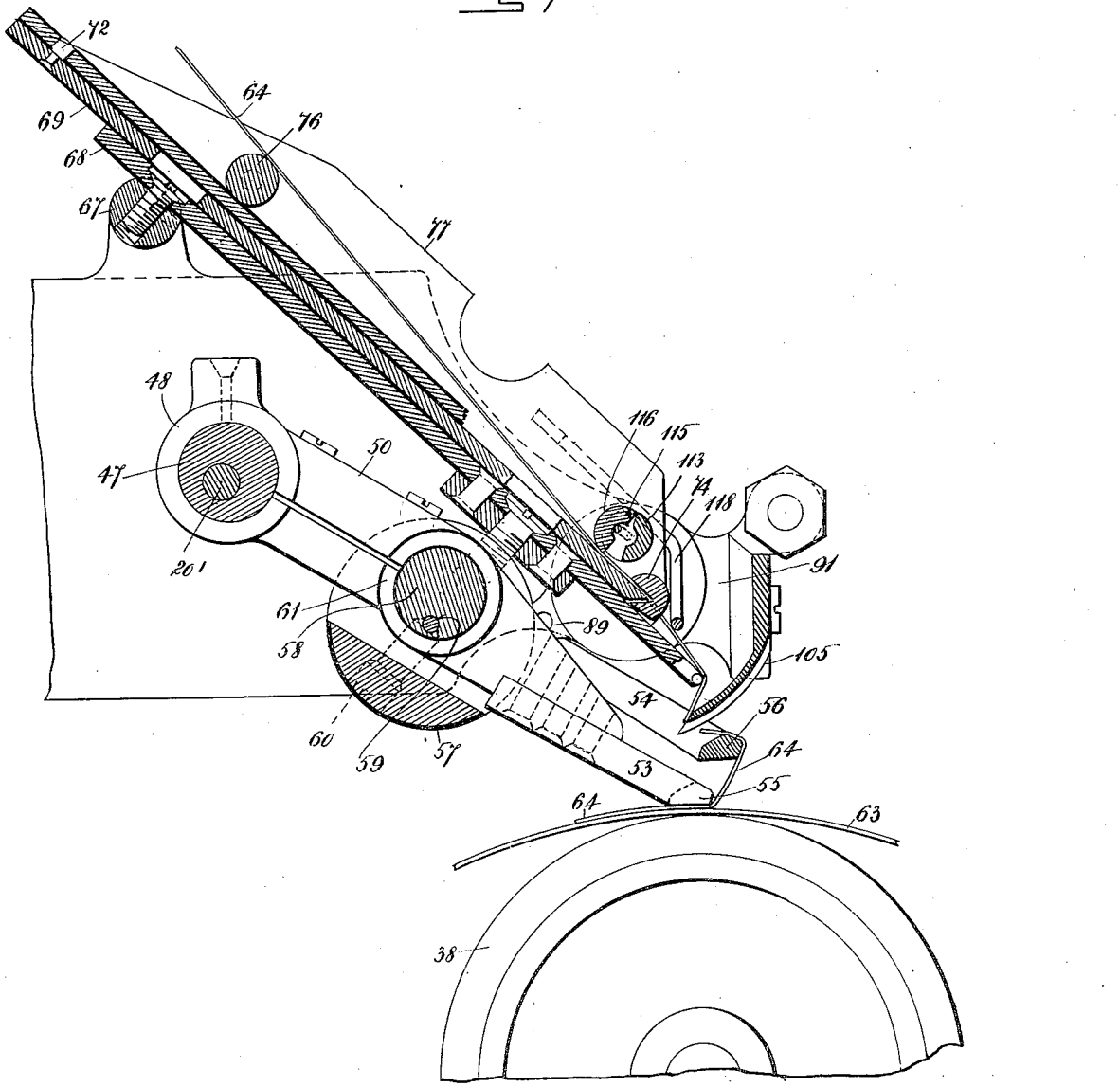
Fig. 7 is a section similar to Fig. 6, representing the cutter in the act of severing the tape.
Figure 8:
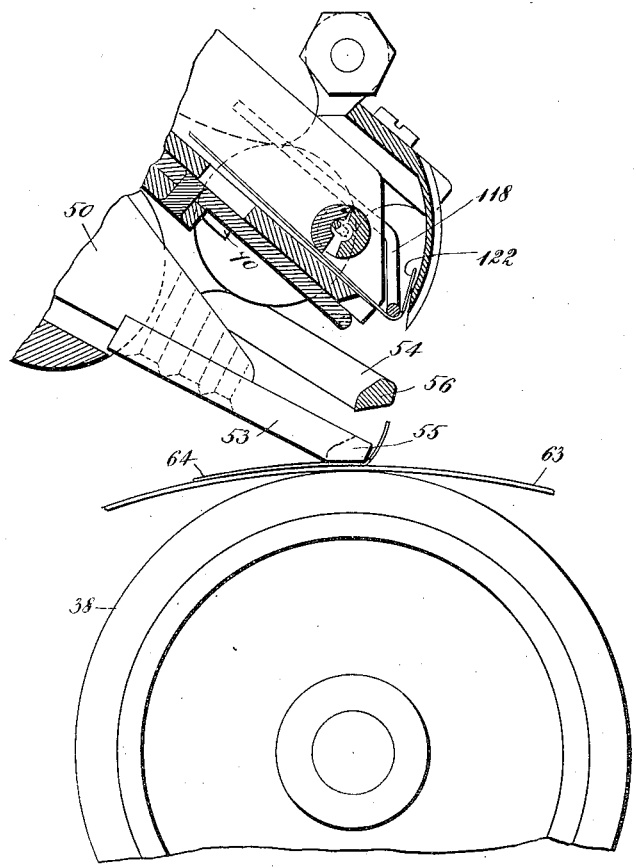
Fig. 8 is a fragmentary sectional view similar to Fig. 7, showing the cutter intermediate its normal and cutting positions after it has severed the tape.

Means are provided for guiding the tape to the feeder, tensioning the same, severing the tape after it has been applied to the work and bringing the severed end thereof in position to be applied to the next piece of work, as follows: Mounted on the stud 67 which extends from the overhanging arm 26 and on the head 57 is a rail 68 which preferably is formed with bevelled sides, and slidably mounted on said rail is a plate 69 provided on its under side with under-cut guides 70, formed in the present instance by tongues punched out of the plate 69, as indicated at 71. Pivoted to the plate 69 at 72 is a tape gauge 73 terminating at its lower end in a finger 74 extending across said plate. By means of the knurled head 75 threaded to the stud 76 which in turn is secured to the flange 77 formed integral with the plate, the end of the finger 74 may be moved toward the flange 77 against the compression of the plate spring 78 interposed between said flange and said gauge. In the present instance, the inner face of the thumb screw 75 co-operates with the outwardly curved portiontion 79 of the tape gauge. Pivotally connected to the flange 77 by the same nut which attaches the stud 76 thereto is a bracket 80 carrying the guide roll 81, and the tape-tensioning roller 82, the latter being hollow and enclosing the spiral spring 83 which surrounds the stud 84 to which the thumb screw 85 is threaded to adjust the compression of said spring and thereby the frictional engagement of the tension roller with its supporting stud, the inner end of said spiral spring bearing against a fibre washer 86 which in turn co-operates with the end wall 87 of said tension roll. A link 88 connects the plate 69 with the lower arm 89 of a bell crank pivoted to the overhanging arm at 90, and whose upper arm 91 is connected by the link 92 to the lever 93 which in turn is rigidly secured to the rock shaft 94. The rock shaft 94 has its bearings at 95 and 96 on the overhanging arm 26, and frame 21, respectively, and carries intermediate said bearings the lever 97 through which passes the rod 98 threaded at its upper end in the frame, and surrounded by the spring 99 interposed between the collar 100 on the lower end of said rod, and said lever 97. The spring 99 normally maintains the lever 97 against the adjustable stop 101 threaded to the top of the frame. A link 102 connects said lever with a treadle (not shown) by means of the chain 103. As will be apparent, the actuation of said treadle will cause the rock shaft 94 to make a partial rotation about its bearings, the amount of which will be limited by the adjustable stop 104 which is threaded into a plate integral with the lever 93, said stop co-operating with the side of the overhanging arm farthest from the operator. The partial rotation of said rock shaft will cause the lever 93 to move toward the over-hanging arm, and by means of the link 92, bell-crank arms 91 and 89 and link 88, the plate 69 is cause to move upwardly along its rail 68 and away from the work support, as shown in Fig. 7. When the treadle is released, the spring 99 causes the parts to resume their normal positions, as shown in Fig. 6, Fig. 7 representing the extreme upward position of said plate or slide 69, and Fig. 8 an intermediate position thereof, assumed as the slide is returning to, but has not quite reached, its normal position.

Mounted on and extending transversely from the upper arm 91 of the bell crank is a cutter 105 consisting of a flat portion 106 through which passes the attaching screw 107 whereby said cutter is secured to said bell-crank arm, and a curved portion which is convex outwardly, or in the direction away from its pivot, and concave inwardly. The inner surface of the cutter is smooth, and the outer surface thereof formed with alternating ridges 108, separated by grooves 109, each ridge terminating in a sharp point 110. The lower edge 111 of each ridge from its terminal point to the end 111' of the V-shaped groove between adjacent ridges is a cutting edge. The lower portion of the inner surface of the cutter from the end 112 thereof to the point 110 on the tip of the ridge may be ground for sharpening the cutter.

As will be obvious from the foregoing description, the actuation of the rock shaft 94 will cause the cutter to rotate, as indicated in Fig. 7, and as more fully explained hereinafter, and sever the portion of the tape which has been applied to the work from the free portion which remains in the chute formed by the slide 69 and its side wall 77. Attached to and extending laterally from the side wall 77 of the chute is a tape lock 113, the details of which are shown in Figs. 9 and 10. The said tape lock consists of a cylindrical stud provided with a peripheral slot 114 in which is pivoted by the pin 115 the semi-cylindrical segment 116, the said segment being normally pressed outwardly and downwardly against the bottom 69 of the chute, or against the tape which moves along said bottom, by resilient means, shown in the present instance as a spring 117 which passes through the stud 113. Projecting from the end of the chute is a wiper 118 formed, in the present instance, from a wire having one end inserted in a hole in the stud 113, as shown at 119, and its other end retained in a groove 120 in the side wall 77 by the same nut 121 which holds the stud to said side wall.

The operation is as follows:—

Figure 2:
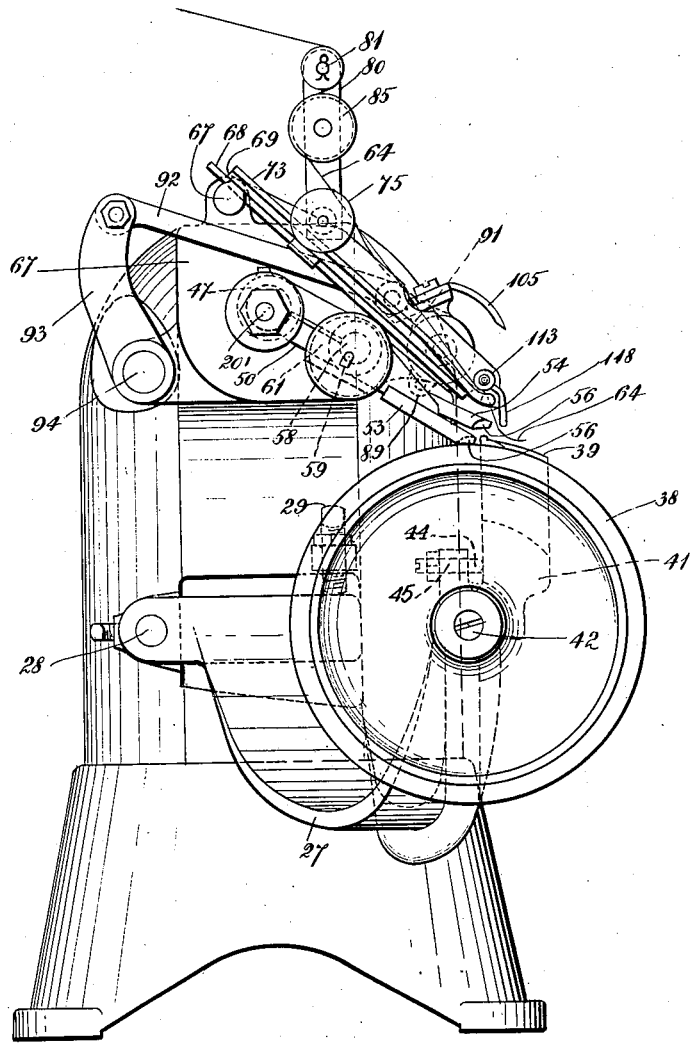
Fig. 2 is an end elevation thereof.
Figure 3:
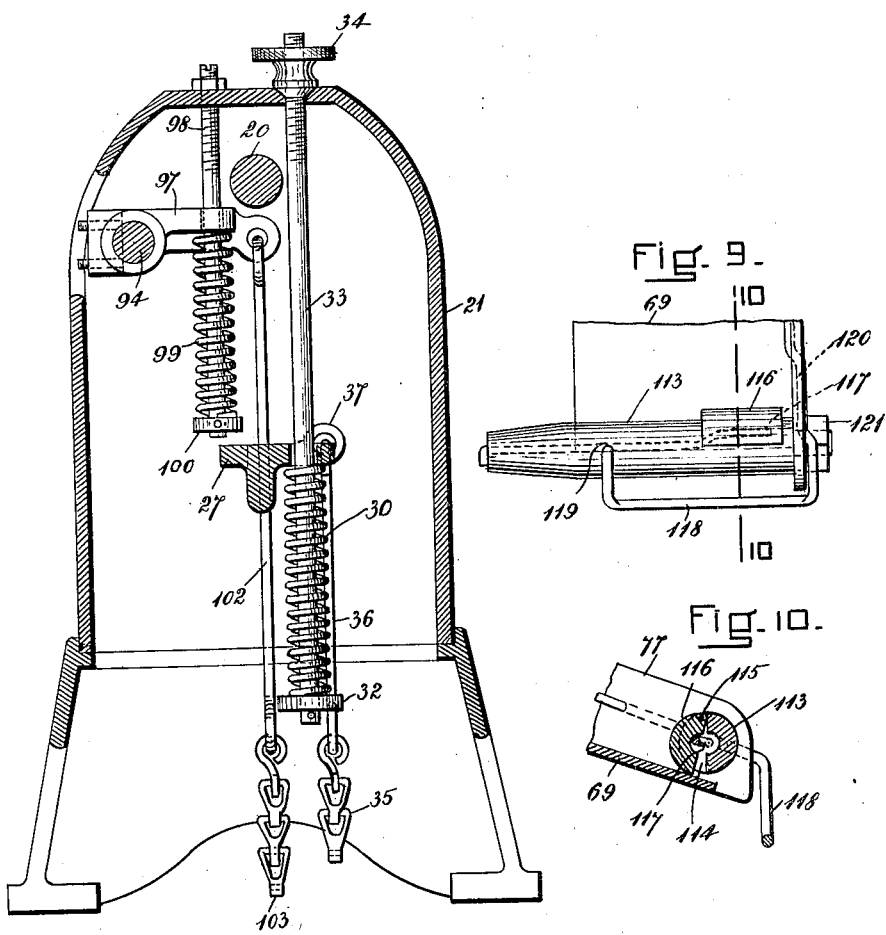
Fig. 3 is a vertical transverse section taken on the line 3—3 of Fig. 1.

A length of adhesive tape supported by a roll holder (not shown) is drawn off the roll and threaded through the machine, as shown in Fig. 2, viz, over the guide roll 81, the uncoated side of the tape being in contact with said roll, and then under the tension roller 82, the coated side of the tape being in contact with the same, over the stud 76, under the tape lock 116, then between the inner end of the gauge 74 and the wall 77 of the slide, and thence under the wiper, a short length extending beyond said wiper. The operator then moves the work support 38 downwardly by rotating the treadle-actuated arm 27 about its pivots, then places the work to which the tape is to be applied on the work support, adjusting the righthand edge thereof to the gauge 39. The treadle is then released and the upward movement of the work support to its normal position will bring the work with the end of the tape resting thereon underneath the presser fingers which, as above explained, constitute the feeding mechanism. When the leather or other work has been reinforced by applying the desired length of tape thereto, the rock shaft 94 is given a partial rotation by actuating the treadle connected to the chain 103, with the results, first, that the slide is moved upwardly to the position shown in Fig. 7, and second, the cutter is moved downwardly to the position shown in said figure. The parts are held in these positions until the presser finger which is making its return stroke has forced the tape against the cutter.

In Fig. 7, the right-hand finger 56 (as the machine is viewed from the front) is shown as making its return stroke and forcing the tape against the knife, the points of which first enter the tape, and the cutting edges 111 then shear the same. It has been found that knife edges and pivoted cutters of the usual type are not effective in the cutting of tape of the type employed with the herein described machine, such tape usually being coated with zinc oxide or a composition containing the same, which soon renders the usual type of cutters inoperative.

I have found in practice, however, that a serrated shearing cutter of the kind illustrated in Fig. 7 is effective for severing tape of the heaviest kind. As soon as the tape has been severed, the operator releases the treadle and thereby permits the spring 99 to retract the rock shaft 94 and the parts associated therewith. As the slide 69 moves forwardly, the wiper 118 comes in contact with the free end 122 of the tape which adheres to the cutter (Fig. 8) and forces it downwardly to a point in proximity to the presser finger, whereupon the operator places another piece of work in the machine over the work support and under the free end of the tape.

As the slide 69 is moving forwardly after the tape has been severed and its actuating treadle released, retrograde movement of the tape is prevented by the tape lock 116 which, being pressed outwardly and downwardly by its spring 117, holds the tape firmly against the slide, thereby enabling the free end to be brought down to operative position.

In Fig. 15 I show a revoluble work support consisting of a metal disc 122 provided with a pair of separated bands 123 which may be of rubber or other suitable material whereby a groove 124 is formed in the peripheral surface of the work-holder. An arm 125 is held for rotarial adjustment about the stud 42 on which the work-holder is mounted, a boss 126 integral with said arm 125 and a set-screw 127 passing through the same being shown for this purpose. Attached to the outer end of said arm and terminating in the groove 124, is a seam guide 128. The operation is as follows: Two pieces of leather or other material 129, 129, united by a seam 130, are placed over the guide 128 so that the seam ridge is above the groove 124. The tape 131 is then applied to the back of the seam in the manner hereinbefore described, the presser fingers or feeding mechanism pressing the seam ridge into the groove so that the tape may be applied to a surface which is approximately level.

Having thus described illustrative embodiments of my invention without however limiting the same thereto, what I claim and desire to secure by Letters Patent is:—

1. A tape-applying machine comprising in combination a tape chute, a tape gauge associated therewith and means for adjusting said gauge laterally with respect to the tape.

2. A tape-applying machine comprising in combination a chute, a roller extending laterally over said chute, a support for said roller, said roller being disposed in the path of the tape and arranged to be rotated by the passage of the tape thereover, and means for adjusting the frictional engagement of said roller with said support.

3. A tape-applying machine comprising in combination a support, a tape chute slidably connected therewith, tape-feeding mechanism located in proximity to the lower end of said chute and means for moving said chute longitudinally of its support.

4. A tape-applying machine comprising in combination a tape chute, a support for the same, tape-feeding mechanism located below the lower end of said chute, means for moving said chute longitudinally of its support relatively to said tape-feeding mechanism, and means for preventing retrograde movement of said tape during the movement of said chute.

5. A tape-applying machine comprising in combination, a tape chute, a stud extending across the same and spaced therefrom, said stud being provided with a peripheral recess, a tape-locking member disposed within said recess and pivoted to said stud, and resilient means co-operating with the inner face of said member normally to force the same outwardly from said stud.

6. A tape-applying machine comprising in combination a rail, a tape chute slidably connected therewith, tape-feeding mechanism located near the lower end of said chute, a tape cutter, and means for moving said chute away from said feeding mechanism and simultaneously moving said cutter toward said feeding mechanism.

7. A tape-applying machine comprising in combination a rail, a tape chute slidably connected therewith, tape-feeding mechanism located near the lower end of said chute, a tape cutter, means for simultaneously actuating said chute and said cutter, and a wiper attached to said chute and disposed between said feeding mechanism and said cutter.

8. A tape-applying machine comprising in combination a rail, a tape chute slidably connected therewith, tape-feeding mechanism located near the lower end of said chute, a pivoted tape cutter having its cutting edge disposed above said chute, and means for moving said chute away from said feeding mechanism and for simultaneously rotating said cutter about its pivot and bringing said cutting edge below the plane of said chute.

9. A tape-applying machine comprising a rail, a tape chute slidably connected therewith, tape-feeding mechanism located near the lower end of said chute, a pivoted tape cutter having its cutting edge disposed above said chute, means for simultaneously actuating said chute and said cutter, and means associated with said chute for moving the free end of the severed tape below the lower end of said chute when the latter resumes its normal position.

10. A tape-applying machine comprising in combination a frame, a rail secured to said frame, a tape chute slidably connected thereto, a bell crank pivoted to said frame, a link connecting one arm of said bell crank to said chute, a rock shaft journaled in said frame, means operatively connecting the other arm of said bell crank to said rock shaft, a tape cutter secured to the last mentioned arm of said bell crank and means for actuating said rock shaft at the will of the operator.

11. A tape-applying machine comprising in combination, a revoluble work support, two presser fingers arranged to co-operate therewith, and means for giving each of said presser fingers, alternately, a straight-line motion in one direction and an oscillatory motion in the opposite direction.

12. A tape-applying machine comprising in combination, a revoluble work support, two oppositely-disposed driving eccentrics, an arm mounted on each of said eccentrics, a presser finger mounted on each of said arms and arranged to co-operate with said work support, and an eccentric arranged intermediate each driving eccentric and one of said presser fingers.

13. A tape-applying machine comprising in combination, a work support, two oppositely-disposed driving members, an arm driven by each of said members, a presser finger mounted on each of said arms and arranged to co-operate with said work support, and a movable pivot arranged intermediate each of said driving members and one of said presser fingers.

14. A tape-applying machine comprising in combination a work support, two presser fingers co-operating therewith, means giving each of said presser fingers, alternately, an oscillatory and reciprocatory motion, and means compensating for said oscillatory motion to convert the same into a straight-line motion in one direction.

15. A tape-applying machine comprising in combination, a work support, two driving members, presser fingers actuated by said driving members, respectively, and co-operating with said work support, and means for giving each of said presser fingers, alternately, a straight-line motion in one direction and an oscillatory motion in the opposite direction.

16. A tape-applying machine comprising in combination a work support, a presser finger co-operating therewith, and a driving member for giving said presser finger a straight line motion in one direction and an oscillatory motion in the opposite direction.

17. A feeding mechanism comprising a work support, a pair of over-walking feeding members arranged to co-operate with said work support, means for oscillating and reciprocating each of said members, and moving means co-operating with said members to vary the motion imparted thereto by the first-mentioned means.

18. A tape-applying machine comprising in combination a frame, an arm pivotally connected thereto, a stop to limit the movement of said arm in one direction, resilient means for holding said arm against said stop, a work holder mounted on said arm and means for imparting a partial rotation to said arm to move said workholder away from its normal operative position for facilitating the placing of the work thereon.

19. A tape-applying machine comprising in combination a work-support provided with a peripheral groove, and a pair of over-walking presser fingers arranged to co-operate with said work support.

20. A tape-applying machine comprising in combination a work support provided with a peripheral groove, a seam guide arranged and terminating immediately above said groove, and presser fingers arranged to co-operate with said work support.

21. A tape-applying machine comprising in combination a revoluble work support provided with a peripheral groove, a guiding member mounted for adjustment circumferentially with said work support, said guide terminating immediately above said groove, and presser fingers co-operating with said work support.

22. A tape-applying machine comprising in combination a base member, an overhanging arm supported thereby, tape-feeding mechanism, a tape chute carried by said arm and terminating in proximity to said tape-feeding mechanism, a rail with which said chute has slidable connection and means for moving said chute longitudinally of said rail.

23. A tape-applying machine comprising in combination a frame, a rail secured to said frame, a tape chute slidably connected to said rail, a curvilinear tape cutter, means pivoting said cutter to said frame, said cutter being convex outwardly or in the direction away from its pivot, and means so connecting said chute and tape cutter that said chute is moved longitudinally of said rail away from said cutter when said cutter is rotated into operative or tape-cutting position.

24. A tape-applying machine comprising in combination, a work-support provided with a peripheral groove, and means for applying a length of tape to the work placed on said support, and for pressing a portion of said work into said groove.

In testimony whereof, I have hereunto subscribed my name this 23d day of April, 1928.

ANDREW R. RIDDERSTROM.